United States Patent [19]

Arcouette

[11] 4,239,137
[45] Dec. 16, 1980

[54] BOAT CARRIER AND STAND DEVICE

[76] Inventor: Pierre Arcouette, 39 Montagne St., Apt. 21, Granby, Canada

[21] Appl. No.: 33,565

[22] Filed: Apr. 27, 1979

[51] Int. Cl.³ .............................................. B60R 9/00
[52] U.S. Cl. .................... 224/319; 206/511; 211/49 R
[58] Field of Search ............ 224/273, 279, 309, 319, 224/325, 329, 324, 42.42 R; 206/511, 512, 509, 499, 503, 504; 211/49 R, 60 R; 220/23.6; 414/450

[56] References Cited

U.S. PATENT DOCUMENTS

| | | | |
|---|---|---|---|
| 2,985,350 | 5/1961 | Taccolini | 224/319 |
| 3,116,701 | 1/1964 | Stough | 206/511 |
| 3,405,810 | 10/1968 | Rogus | 206/509 |
| 3,407,961 | 10/1968 | Box | 206/511 |
| 3,424,334 | 1/1969 | Goltz | 206/511 |
| 3,567,035 | 3/1971 | Dudaik | 211/49 R |
| 4,000,704 | 1/1977 | Griffin, Jr. | 206/511 |
| 4,032,014 | 6/1977 | Weiss | 211/49 R |
| 4,081,118 | 3/1978 | Mason | 224/325 |

FOREIGN PATENT DOCUMENTS 656578 1/1963 Canada .................................. 224/325

Primary Examiner—Robert J. Spar
Assistant Examiner—Kenneth Noland

[57] ABSTRACT

A carrier and stand device for a boat, such as a canoe, and, in particular, a kayak and characterized by its structural advantages as well as for its versatility for use during any phase of the boat life from production to the user, including transportation, storage and display. This device includes a pair of transverse U-shape frames and connector rods allowing to disconnect the pair of frames and compactly store away the components during non-use. The frames are provided with sets of sockets and projections allowing positive stacking of a plurality of such devices in a number of different ways for convenience in storage and display.

5 Claims, 11 Drawing Figures

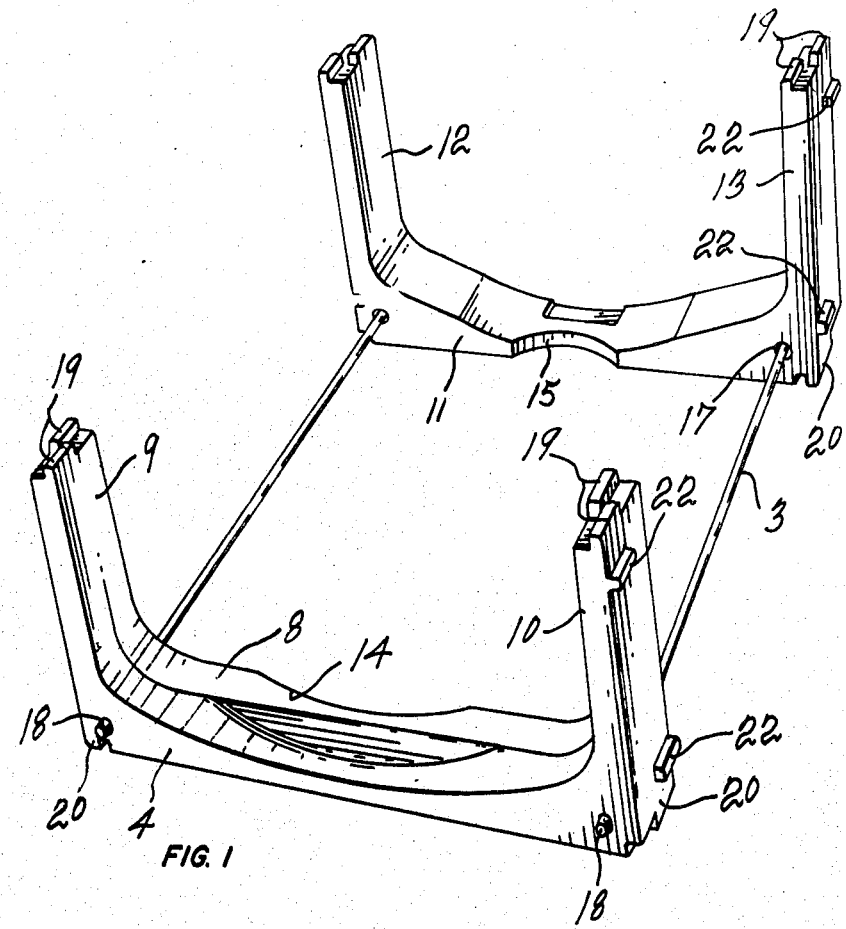
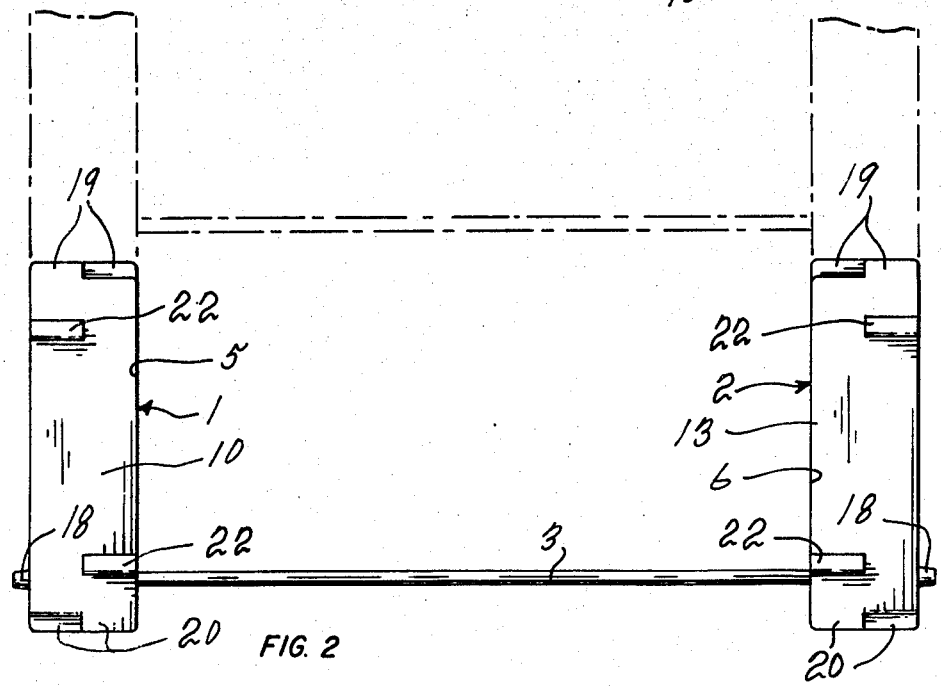

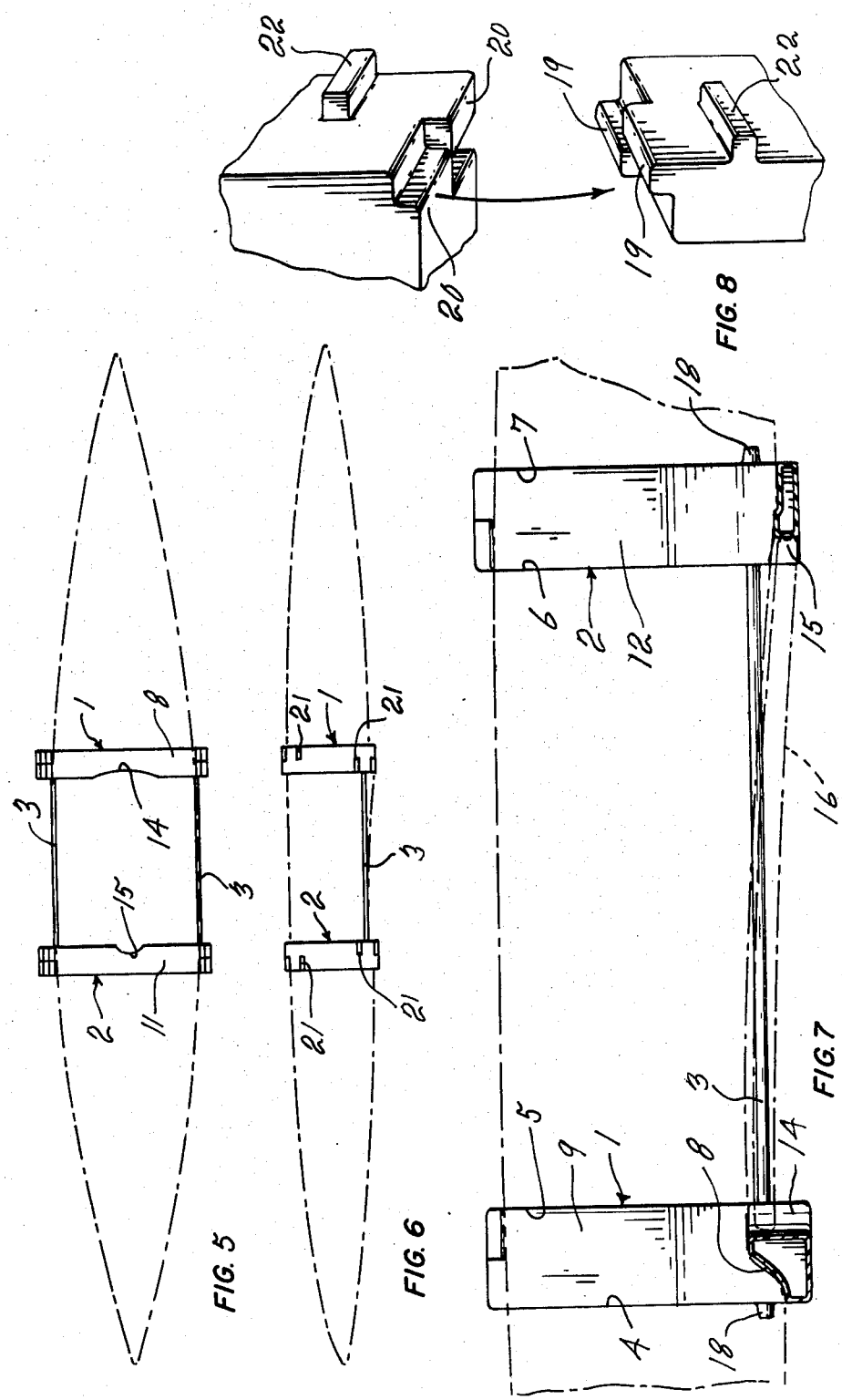

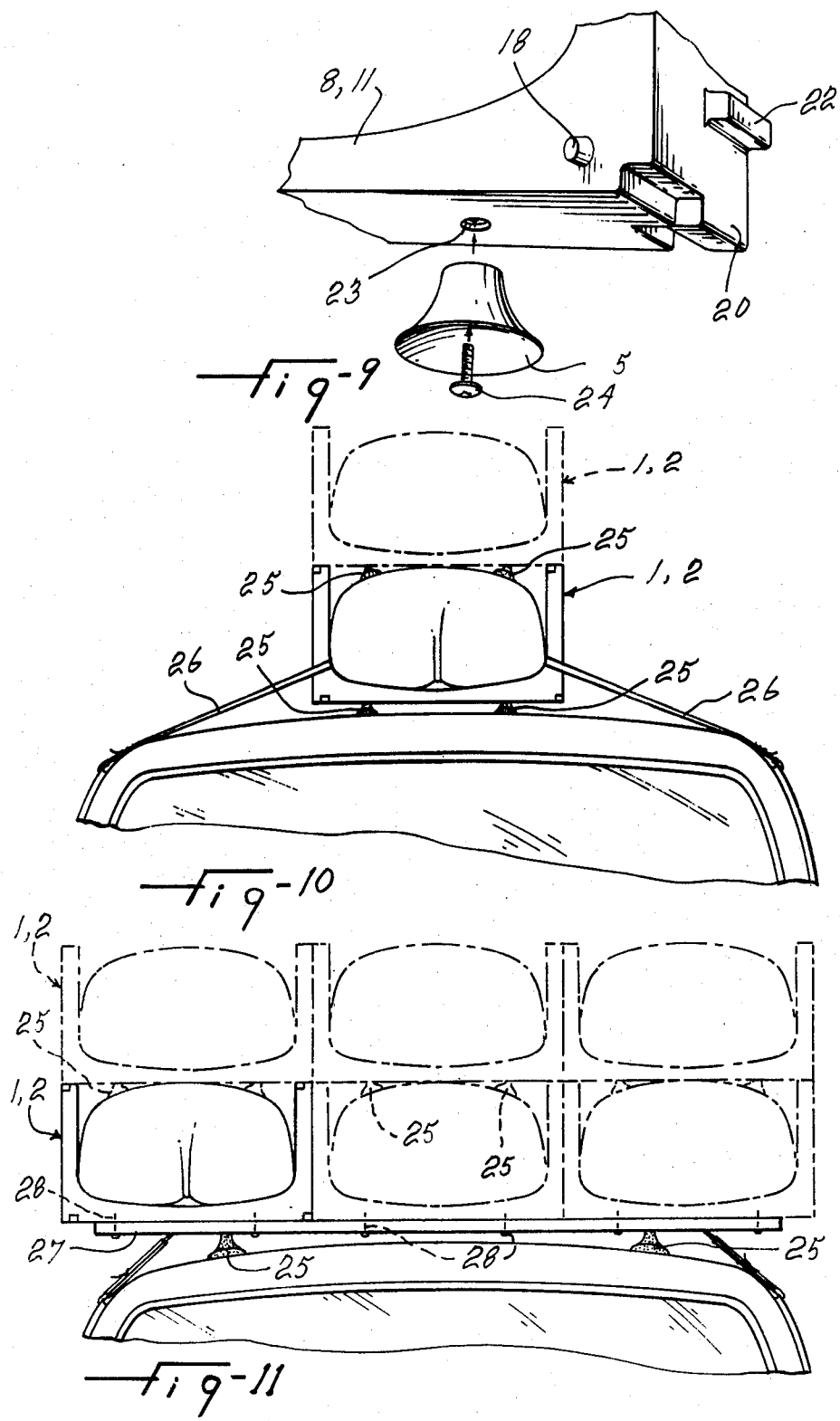

BOAT CARRIER AND STAND DEVICE

This invention relates to a device of the type adapted to carry and generally support a boat, such as a canoe and, in particular, a kayak.

The canoes are now generally transported in racks, such as mounted on the platform of trucks. This mode of transportation is not found satisfactory and, besides, it does not provide a stand or rack for the boat which could be used in the warehouse, store or by the buyer. In the case of a kayak, there is a strong need for some suitable device to carry or support such boat, in particular to protect its lustrous exterior finish.

It is a general object of the present invention to provide a device particularly adapted to carry and support a boat, such as a canoe, and, in particular, a kayak during any phase from production to the user, including transportation, storage and display.

It is another object of the present invention to provide a boat carrier and stand device of the above type which is convenient as a carrier for truck, train and cartop transportation, as well as a stand for compact storage or display.

It is a further object of the present invention to provide a boat carrier and stand device of the above type which is of simple, light weight and inexpensive construction.

It is still another object of the present invention to provide a boat carrier and stand device of the above type, which is formed of a few simple components which disconnect for compact storage and transportation.

It is a still further object of the present invention to provide a boat carrier and stand device of the above type, which is adapted to be conveniently compactly and positively stacked in a number of different ways with other similar carrier and stand devices, such as for convenient storage of kayaks or canoes in piles and rows in a warehouse for delivery and for store display.

The above and other objects and advantages of the present invention will be better understood with reference to the following detailed description of a preferred embodiment thereof, which is illustrated, by way of example, in the accompanying drawings, in which:

FIG. 1 is a perspective view of a boat carrier and stand device according to the present invention;

FIGS. 2 and 3 are side and top views, respectively, of the boat carrier and stand device of FIG. 1;

FIGS. 5 and 6 are schematic bottom and side views, respectively, of a boat carrier and stand device in association with a kayak operatively placed upside down therein;

FIG. 7 is a cross-sectional view as seen along line 7—7 in FIG. 4;

FIG. 8 is a perspective view of one set of socket elements or lugs projecting from one end of one side of one transverse frame and the opposite end of the corresponding side of another transverse frame providing for interengagement of these lugs upon stacking of the two frames;

FIG. 9 is a perspective view of part of a frame with a suction cup shown in exploded view;

FIG. 10 is an end view of a cartop illustrating the superposed mounting of a pair of carrier and stand devices thereon; and FIG. 11 is an end view of a cartop illustrating the mounting of six boat carrier and stand devices thereon in accordance with the present invention.

Figure 3:
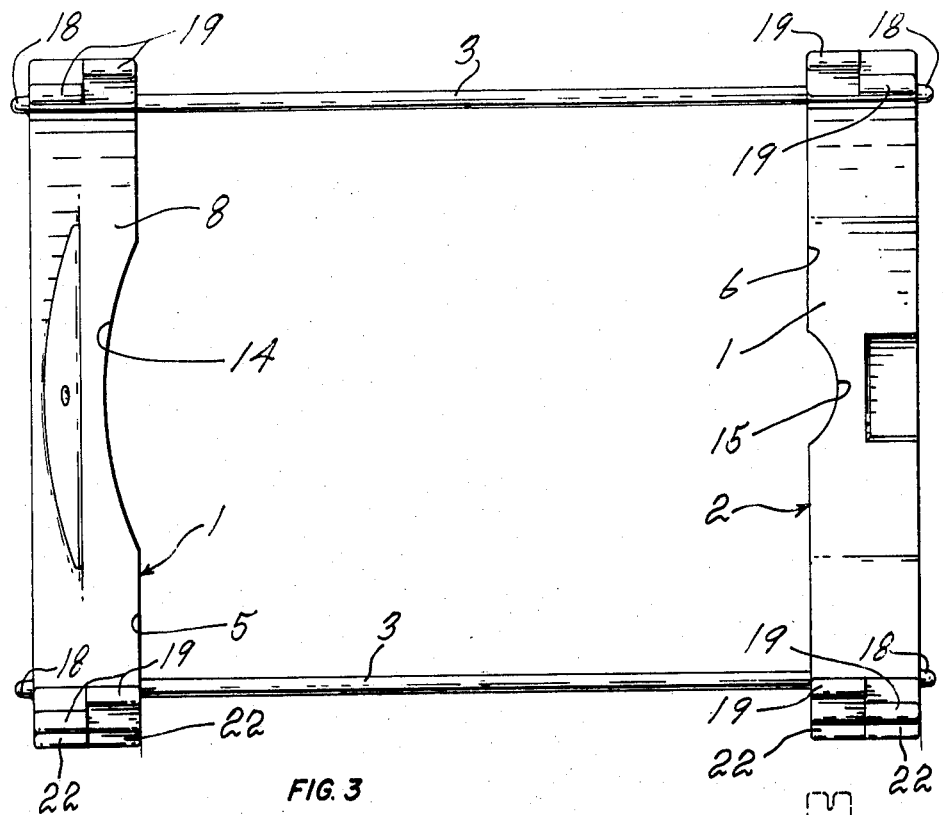

The illustrated boat carrier and stand device is particularly adapted to carry or support a kayak and essentially comprises a pair of transverse frames 1 and 2 and a pair of longitudinal connector rods 3.

Each transverse frame 1 and 2 is of rectangular U-shape outline and has a pair of parallel flat faces 4, 5, and 6, 7 respectively. The transverse frame 1 includes an intermediate portion 8 and a pair of opposite sides 9 and 10 cooperatively defining the afore-mentioned U-shape configuration. The transverse frame 2 similarly includes an intermediate portion 11 and a pair of opposite sides 12 and 13, also forming the afore-mentioned U-shape configuration.

The intermediate portions 8 and 11 are formed each with a concave outline 14 or 15 in the inner face 5 and 6 of the corresponding transverse frames 1 and 2, respectively. These concave outlines 14 and 15 are made complementary to the outline at the opposite ends of the rim 16 around the top opening of a kayak, such as to clamp against the same rim when a kayak is placed upside down on the intermediate portions 8 and 11, between the sides 9, 10 and 12, 13.

The transverse frames 1 and 2 are each formed with a first set of socket elements and complementary projection elements in the form of a pair of depressions 17 and a pair of complementary projections 18. The depressions 17 are formed in the inner faces 5 and 6, while the projections 18 are formed in the outer faces 4 and 7 in alignment with the depressions transversely through the intermediate portions 8 and 11. The connector rods 3 extend in the depressions 17, through the intermediate portions 8 and 11 and into the bosses or projections 18 where they are removably secured such as by setscrews or by any other expedient.

When the rods 3 are removed, the transverse frames 1 and 2 may be stacked flat one on the other with the pair of projections 18 of one resting in the pair of depressions 17 of the other. For transportation and storage, a plurality of frames 1 and 2 may be similarly stacked flat and sturdily one against another with the projections 18 of one in the depressions 17 of another.

Figure 4:
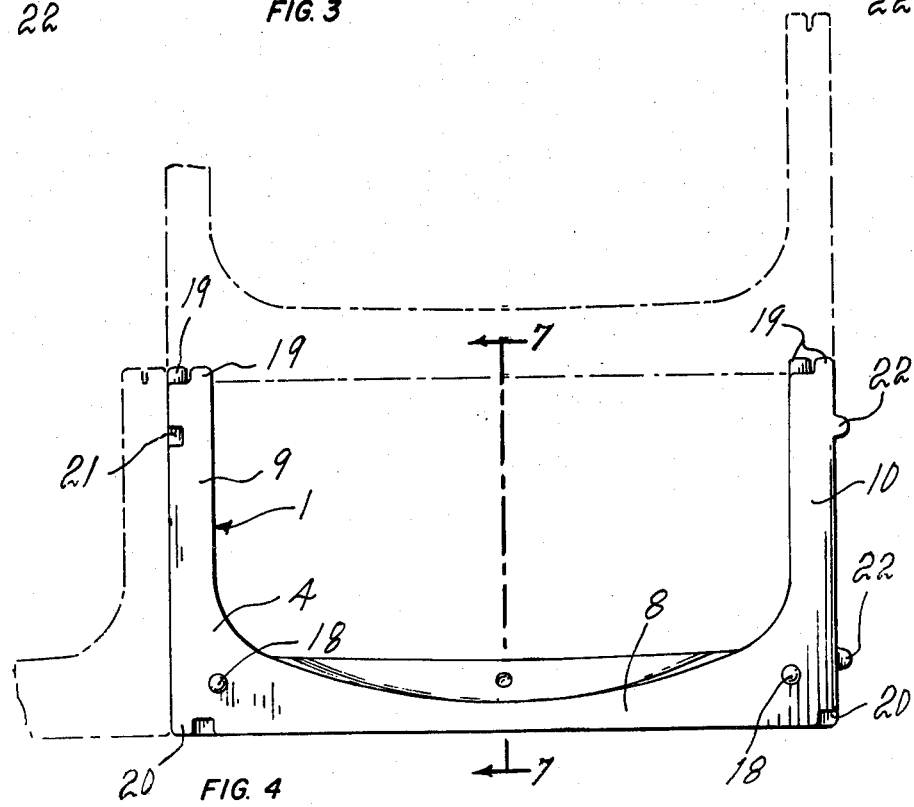
FIG. 4 is an end view of one device shown in full lines in laterally and upwardly stacked relationship with two other similar devices, partly shown in dashed lines.

The transverse frames 1 and 2 are each formed with a second set of socket elements and complementary projection elements. The latter are defined by lugs 19 and 20 projecting endwise from the outer and inner ends, respectively, of the opposite sides 9, 10 and 12, 13. The lugs 19 are complementarily arranged relative to the lugs 20, whereby upon super-position of two carrier and stand devices, as shown in FIGS. 2, 4, and 8, the lugs 20 of the upper device, or frames 1 and 2, fit in interdigital engagement between the lugs 19 of the underlying device or frames 1 and 2. Thus, the spaces between the lugs 19 or 20 form sockets for the complementary lugs 20 and 19, respectively.

The transverse frames 1 and 2 are each formed with a third set of socket elements and complementary projection elements defined by a pair of cavities 21 and a pair of complementary protuberances 22. The cavities 21 are provided in the external lateral face of each side 9 and 12, while the protuberances are provided in the external lateral face of each side 10 and 13, such that, upon lateral juxtaposition of two carrier and stand devices, as shown in FIG. 4, the protuberances 22 of one device will register with and engage in the cavities 21 of the other device.

It must be noted that the second and third sets of socket elements and projection elements are staggered to produce positive registry of the carrier and stand devices with each other for compact and sturdy stacking or piling in rows and/or piles and either upright or sideways.

In practice, such devices with kayaks therein were piled or stacked 14 feet high without difficulty. For compact storage in a warehouse, they may be staggered with a pointed end of the kayak of one row or pile offset and engaged between a pointed end of the kayak of another row or pile to gain space.

The intermediate portion 8, 11 of each transverse frame 1, 2 is provided near each end with a threaded aperture 23 inwardly extending therein parallel with the sides 9, 10 or 12, 13. This aperture 23 allows the engagement of a screw 24 therein with or without a suction cup 25, as best shown in FIG. 9.

As shown in FIGS. 10 and 11, the boat carrier and stand device may be used as a cartop carrier, to carry any number of boats or kayaks on the top of a car. This may be done, as shown in FIG. 10, by fixing the suction cups 25 and engaging the latter on the underlying top of the car or on the underlying hull of an upside down boat or kayak. Elastic bands 26 may preferably be used to laterally stabilize the whole mounting. As shown in FIG. 11, the frames 1, 2 may, instead, be bolted and screwed to transverse bars 27, which are supported by suction cups 25 on the cartop. These screws or bolts are shown in this case at 28. The second row or layer of frames 1, 2, instead, have the suction cups 25 directly secured thereto to adhere to the underlying hulls.

What I claim is:

1. A boat carrier and stand device comprising a pair of transverse frames and a pair of longitudinal connector rods removably joining said transverse frames one to the other, each transverse frame of generally U-shape and rectangular outline and each having opposite faces extending generally flat and parallel to each other, each transverse frame defining an intermediate portion and a pair of elongated side legs projecting upwardly from the ends of said intermediate portion for straddling a boat resting on said intermediate portion, said intermediate portion having a flat bottom wall and each side leg having an external side face which is flat and straight and which is perpendicular to said bottom face of said intermediate portion, and each of said transverse frames including socket elements and complementary projection elements cooperatively interengaging similar socket elements and projection elements of other adjoining boat carrier and stand devices and of another transverse frame of the same boat carrier and stand device when said rods are removed from said transverse frames, said socket elements and complementary projection elements including a first set of such elements complementarily arranged on the opposite flat faces of said transverse frames for producing complementary inter-engagement of said socket elements and complementary projection elements when said transverse frames are stacked directly one on another, a second set of such elements complementarily arranged on the opposite ends of said opposite elongated side legs whereby said carrier and stand devices can be stacked one on top of the other with the corresponding side legs in respective vertical alignment and a third set of such elements complementarily arranged on the external side face of each of said side legs for inter-engagement when said carrier and stand devices are juxtaposed side by side.

2. A boat carrier and stand device as defined in claim 1, wherein each of said transverse frames has one face formed with a concave outline extending in the intermediate portion thereof, operatively facing the concave outline in the intermediate portion of the other transverse frame, and abutting against the rim around the top opening of a kayak placed in the carrier and stand device.

3. A boat carrier and stand device as defined in claim 1, wherein said second set of socket elements and projection elements includes lugs projecting endwise from the opposite ends of said opposite side legs and complementarily arranged for interdigital engagement of the lugs of one of said opposite ends of one of said transverse frames with the lugs of the other of said opposite ends of another transverse frame of another boat carrier and stand device, and said third set of socket elements and projection elements of each of said transverse frames includes cavities and protuberances formed in the external opposite lateral faces of the opposite side legs respectively.

4. A boat carrier and stand device as defined in claim 3, wherein said rods longitudinally extend through said frames and depressions and are releasably secured into said projections.

5. A boat carrier and stand device as defined in claim 4, wherein said intermediate portion includes threaded apertures extending therein and opening at said bottom wall, threaded fasteners removably engaging in said threaded apertures, and suction cups selectively securable by said fasteners to said intermediate portion and operatively projecting from said bottom wall.

* * * * *